March 31, 1964 J. A. CLARK ETAL 3,126,912
DIAPHRAGM VALVE HAVING A SAFETY SHUT-OFF MEANS
Filed Sept. 12, 1961 2 Sheets-Sheet 1

INVENTORS
JAMES A. CLARK,
JOHN O. MORRISON,
BY
McMorrow, Berman + Davidson
ATTORNEYS.

March 31, 1964    J. A. CLARK ETAL    3,126,912
DIAPHRAGM VALVE HAVING A SAFETY SHUT-OFF MEANS
Filed Sept. 12, 1961    2 Sheets-Sheet 2

INVENTORS
JAMES A. CLARK,
JOHN O. MORRISON.
BY
McMorrow, Berman & Davidson
ATTORNEYS.

3,126,912
DIAPHRAGM VALVE HAVING A SAFETY SHUT-OFF MEANS

James A. Clark, Butte, Mont., and John O. Morrison, Worland, Wyo., assignors to Western Instrument Corporation, Worland, Wyo., a corporation of Wyoming
Filed Sept. 12, 1961, Ser. No. 137,560
13 Claims. (Cl. 137—614.14)

This invention relates generally to valve constructions. More particularly, the invention has reference to a valve which will not only be adaptable for general purpose use wherever the flow of an aeriform substance is to be controlled by valve action, but also for a wide variety of other special purposes or applications.

This application is a companion to application filed by us concurrently herewith, presently entitled "Combination Valve and Liquid Level Gauge," Serial No. 138,231, filed September 12, 1961 and is a companion application, also, with our co-pending application Serial No. 729,392, filed April 18, 1958, entitled "Device for Gauging, Metering, or Measuring Liquids," Patent No. 3,012,437.

One important object is to provide a valve that will be usable to particular advantage on containers of various gases, as for example propane, butane, or any of the hydrocarbon gases. In this connection, it is proposed to provide a valve falling in the general category of diaphragm valves, that will be especially useful in controlling the flow of gases of a more dangerous, poisonous, or volatile nature, such as those gases whose liquefication requires considerably greater pressures than have heretofore been commonly associated with a valve of the diaphragm type.

Primarily, it may be considered that the multi-purpose valve comprising the present invention has three particular phases, other than its intended use with gauges of the types disclosed in the above mentioned companion applications. The valve is designed not only for general purpose use with moderate pressures, but has particular features rendering the same adaptable, to an equal extent, for pressures that are considerably greater than those heretofore associated with a diaphragm type valve.

In this connection, it is proposed in carrying out the present invention to engineer each phase of the valve in such manner as to impart to the same the basic characteristic of complete, all-purpose suitability for both low and high pressure conditions. Consequently, in carrying out this main purpose, it has been an object to impart to each phase of the valve advanced, novel, engineering characteristics effectively distinguishing the same in structure and operation from valves of the prior art.

One object of importance is to provide a valve which will be of the combination type, including a manually operable shut-off assembly having a particularly improved seal designed to withstand exceptionally high pressures without possibility of even an infinitesimal leakage. To this end, there is provided a seal in this portion of the valve which prevents leakage about the mechanically operable stem of the shut-off valve, said seal being akin to seals of the diaphragm type, with the sealing action being wholly retained, and being completely unaffected by the position of the valve.

Another object, in connection with the diaphragm type of seal incorporated in the valve, is to eliminate the deficiencies which have been noted in conventional diaphragm arrangements, by providing a solid backing of a metallic substance upon the entire face of the diaphragm opposite the pressure face therof, thereby relieving the device of structural stress, and eliminating a dangerous fatigue factor caused by intermittent or sustained high pressure which has been noted in conventional diaphragms not provided with any backing means.

Another object is to embody, in the combination valve comprising the present invention, a safety relief valve means, designed to operate efficiently and immediately whenever the pressure within a container exceeds a predetermined value.

Still another object is to incorporate, in the safety relief valve means, a self-contained bleeder, manually operable whenever necessary in such a manner as to provide a decided time-conserving factor during the filling or charging of the container on which the valve is used. To this end, the safety relief valve means having the built-in or self-contained bleeder is so designed that any air within the container can be released simultaneously with filling of the container.

Another object is to so design the bleeder means referred to above, as to incorporate therein air ports or orifices, directed toward the seat of the safety relief valve means, in such a manner as to enable the user to conveniently remove any sand, dirt, moisture, or other foreign material that might accumulate in the valve structure due to adverse weather conditions or other factors tending to produce malfunctioning of the safety relief valve.

In accordance with the invention, the construction is such that release of air from a container during charging or filling of the container causes the component portions of the safety relief valve to be automatically cleaned by impingement of the released air thereagainst.

A further object is to incorporate in the combination valve a novel, efficiently operating means for controlling excess flow through the line, in conjunction with a volume control means.

A more specific object, in connection with the volume control means, is to cause the same to operate in such a manner that in the event of a sudden breakage of the line downstream from the valve, the volume control means would be activated, and the supply of gas passing through the line would suddenly be cut off. In this regard, while this arrangement is common to other volume control types of valves, said volume control means of the present invention is particularly designed to cut off the supply of gas or other fluid completely, as distinguished from the volume control valves of the prior art, wherein the cutting off of the flow is not total, and is such as to leave a certain, even though small, amount of leakage. This feature makes the volume control means readily available as an optional safety shut-off means should the user so desire.

Another object, in connection with the volume control means, is to provide an arrangement wherein the valve element of the volume control portion of the device will be held tightly upon its seat by pressure of the gas within the container associated with the valve device, said valve element being nevertheless designed for removal from its seat responsive to closing of the valve. In this connection, it is proposed to provide a pin centered in the shut-off piston portion of the device, which will act as a guide for the volume control valve element, and will also push such element downwardly off its seat whenever the shut-off valve is manually closed.

Yet another object, in connection with the volume control means, is to permit the same to be intentionally rendered non-operational, either by tightening an associated adjustment means disposed at the outside of the valve body, or alternatively by manually closing the shut-off valve partially, that is, by manual movement of the shut-off valve piston means to an intermediate location substantially midway between its opposite extreme positions.

Another object is to provide a valve construction such that even when the manually operable shut-off valve means is open and is in operation, the slug or valve element of the volume control valve assembly can be adjusted from a location exteriorly of the valve housing in such a way as to constitute a volume control valve without the safety shut-off being effective. It is further proposed, in this regard, to so design the arrangement that within a limited range of pressure said valve element or slug can be adjusted to a position such that it will constitute both a safety shut-off and a volume control means.

Another object is to so design the excess flow or volume control feature of the construction as to cause the same to be adjustable without the usual requirement of changing its controlling spring. In ordinary valve arrangements, such adjustments are effected only by changing the control spring for either a lighter or heavier spring. In accordance with the invention, the spring tension associated with the excess flow components is adjustable merely by removal of a conveniently located sealing cap to expose the adjusting screw, with the arrangement being such that the adjustment can be made while the valve is installed and is in normal operation.

Still another object is to provide a valve construction of the combination type which not only will have the various desirable characteristics noted above, but in addition will be such that the entire lower half of the valve can be removed, so as to eliminate the safety shut-off and the volume control features, the construction being further designed to permit the bleeder tube to be removed while leaving the bleeder itself intact, all in an arrangement such that there will still remain a compact shut-off, bleeder, and safety relief combination valve. In this way, it is proposed to permit the cost of manufacture to be reduced, in that the manufacturer can assemble only as many components as is desired in producing a particular type of valve, with all the components being interchangeable in valves of different types sold by the same manufacturer.

Other objects will appear from the following description, the claims appended thereto, and from the annexed drawing in which like reference characters designate like parts throughout the several views and wherein:

To facilitate understanding of the construction and operation, the detailed description of the multi-purpose valve which follows has been broken down into sections, each under an appropriate heading.

*Flow Passage Shut-Off Portion*

The valve comprising the present invention has been generally designated at 10, and as will be understood, would be mounted upon the upper end of a vertically elongated cylinder or container of the type used for holding propane, butane, or similar gases. Of course, as previously indicated in the objects, the valve has general utility, although designed especially for and usable to particular advantage in controlling the flow of gas from a container in which the gas is maintained under pressure.

The valve 10 includes a valve body 12, having a horizontally extending portion 13 formed with a threaded bore 14 merging into a smooth walled tapered part 16. Bore 14 is adapted to receive a complementarily threaded connecting fitting or similar means, whereby an outlet line, not shown, can be connected to the valve to lead the outflowing gases or other fluids away from the container on which the valve is mounted, to the point of use of said gases.

Figure 5:
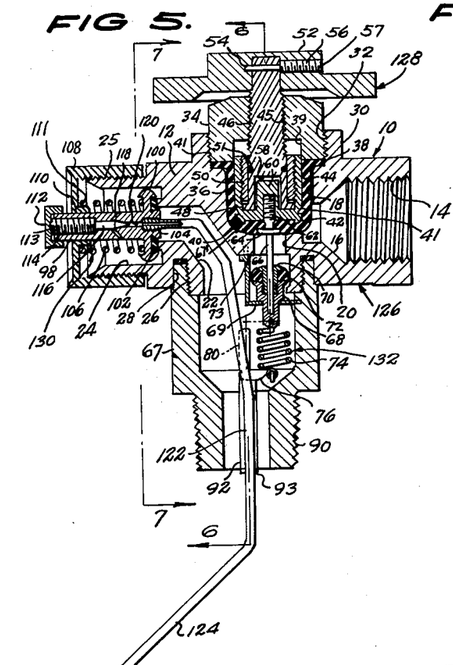
FIGURE 5 is a sectional view through the complete valve, taken substantially on line 5—5 of FIGURE 1.

The tapered inner part 16 merges into a manual shut-off bore 18, which as shown in FIGURE 5 merges at its lower end into a reduced passage 20. Passage 20 at its lower end opens into communication with the lower end of a relief passage 22 extending obliquely to the length of the passage 20.

The relief passage 22, at the end of the valve body remote from the bore 14, opens into a counterbore 24, defining a chamber in which the safety relief and bleeder means are mounted.

The counterbore 24 is formed in an exteriorly threaded end portion 25 of the valve body, disposed at the end thereof opposite the end to which the outlet line is connectable.

Intermediate the ends of the valve body, there is formed thereon a depending, externally threaded neck 26, through which opens the communicating passages 20, 22. Neck 26 is surrounded by a downwardly opening, annular groove or recess 28 of the valve body.

Formed upon the top surface of the valve body is a low, upwardly projecting, circular boss 30, and opening upwardly through the boss 30 is a threaded recess 32, in which is engageable a retaining nut 34.

Recess 32 is in communication with the bore or chamber 18, and snugly fitted within said chamber 18 is a resiliently distendable, cup-shaped shut-off valve diaphragm or sealing element 36.

The sealing element or diaphragm 36, by reason of its cup shape and certain other characteristics to be described hereinafter, differs materially from diaphragms in conventional valves of which we have knowledge. The diaphragm 36 is molded with a plurality of different resiliencies, at different locations upon its area, and these different resiliencies decrease and increase with variable degrees of rapidity, with the end wall or bottom of the diaphragm being considerably thicker and much less resilient than the somewhat cylindrical, considerably resilient side wall. The arrangement is such that the diaphragm is molded to cause a balance between, and effectively minimize, mechanical and pressure fatigue therein.

In this connection, although only one diaphragm has been illustrated for the purpose of providing a typical, presently preferred embodiment of the invention, it will be understood that the diaphragm in a commercial unit would be of two different lengths with either being usable in the same size valve casing. The longer length diaphragm would be usable for exceptionally high pressures only, with the shorter being for general purpose use.

The side wall of the longer diaphragm, when assembled in the valve casing, would be at complete rest, that is, would not be resiliently elongated, when the valve is in its closed position. The shorter diaphragm, however, would be slightly, resiliently elongated in said closed position.

Thus, the shorter diaphragm wall would be subject, somewhat, to elongation and contraction, while the longer diaphragm would not be subject to resilient elongation, though being subject to compression in a longitudinal direction and to relief of said compression as the shut-off means of the invention is correspondingly opened and closed.

The sealing element 36 of the shut-off valve means is provided at its upper end with an outwardly directed, continuous, retaining lip 38, and the nut 34 bears at its lower end tightly against said lip 38, compressing the same so as to prevent leakage about the nut.

The retaining nut 34 is relatively large, the manually operable shut-off valve stem 46 being axially threaded therethrough. The nut has an inwardly extending, smooth walled, cylindrical recess 39 into which the upper portion of the rigidly constituted retainer 44, which will be described in greater detail hereinafter, is fitted. The exterior surface of said upper portion of retainer 44 is slidingly positioned in recess 39 with a close tolerance, and the area between the edge of the inwardly extending cylindrical recess 39, at the open end of said recess cooperates with the adjacent periphery of retaining nut 34 in forming a flat annulus on the face of the retaining nut rim. The outer portion of said annulus holds the diaphragm lip against an annular shoulder 41 that extends outwardly at the top of the diaphragm chamber. The inner portion of said annulus extends inwardly over the diaphragm chamber as an encircling abutment across the thickness of the rim of the cylindrical diaphragm wall. It thus is disposed to serve as an abutment against which the cylindrical diaphragm wall is longitudinally compressed as the shut-off valve means is opened to a flow-permitting position.

It is to be observed at this point that while the diaphragm is partially disposed as a flow passage shut-off valve means, it is also so disposed that at all times and in all positions of the shut-off means, it will effect a particularly improved seal designed to withstand exceptionally high pressures without possibility of even an infinitesimal leakage about the mechanically operable stem 46 of the shut-off valve means.

While the use of a conventional diaphragm is not uncommon as a sealing means for a stem action, the arrangement differs from conventional, generally related structures in that this seal, though akin to the diaphragm type, is so associated with a protective metallic backing afforded by the retainer 44 that it is able to withstand considerably greater pressures than those heretofore commonly associated with a conventional diaphragm.

As will be noted from FIGURE 5, formed in the inner surface of the sealing element 36, at the lower end thereof, is a continuous, annular recess 40, of dovetail or undercut cross section. An internal rib 41 of the diaphragm aids in defining the recess. Snapping into and tightly engaged within said recess 40 is an annular collar 42 of complementary cross section, formed upon the lower end of the cup-shaped, metallic sealing element holder or retainer 44. Said collar defines in part a circumferential recess or groove of the retainer into which the rib 41 snaps.

As will be noted from FIGURE 5, the generally cylindrical, considerable resilient wall of the diaphragm has a constant inside diameter over the full distance from the location where the lip 38 is anchored, to the location of the internal rib 41. As a result, across the diameter of the diaphragm at its greatest dimension, its opposite, interior surfaces as viewed in FIGURE 5 are parallel in a longitudinal direction. The construction is such that when assembled with its associated components, the diaphragm is never mechanically bent by the action of the shut-off means of which it is a part. Therefore, a mechanical bending fatigue factor, common to conventional diaphragms, is effectively combated.

With further reference to the diaphragm construction, the inwardly projecting, molded formation of the diaphragm side wall adjacent the bottom of the diaphragm forms the internal, circumferential rib 41, and the added thickness of the diaphragm wall at this point reduces the resiliency of said wall. Rib 41 cooperates in the formation of a continuous, annular recess, this being the recess 40. Recess 40 extends partially into the only slightly resilient, relatively thicker bottom of the diaphragm. The rib and recess 41, 40 respectively, constitute means serving as an attaching means in part, to connect the diaphragm to adjacent components of the shut-off valve assembly.

With further reference to the adjacent components of the shut-off means or assembly, the retainer 44 is rigidly constituted, and it is important to note that its exterior is shaped correspondingly to the internal surface configuration of the diaphragm. As a result, the external surface of the retainer 44 extends as a solid backing for the diaphragm over the entire area of the diaphragm opposite the area against which the pressure is exerted. This relieves the diaphragm of the structural stress of intermittent or sustained pressures. Thus, the arrangement effectively prohibits any bending, bulging, or rupture of the diaphragm by said stress against the same that would otherwise result responsive to the imposition of pressures considerably greater than those heretofore commonly associated with a valve of the diaphragm type.

As previously noted, the retainer has adjacent its lower end the collar 42, and this defines the encircling recess in the retainer. Thus, the collar and the recess aid in the formation of one another, and complement the matching recess and rib of the diaphragm so as to snugly snap into engagement therewith. This interengagement of the diaphragm and retainer is effected prior to insertion of the diaphragm into its freely fitted matching somewhat cylindrical chamber, said chamber being designated at 18 and being so disposed as to serve as the remainder of the means for attaching the diaphragm firmly to the rigidly constituted retainer 44.

Centrally formed in the nut 34 is the threaded, axial bore 45, and engaged in said bore 45 is the complementarily threaded stem 46 of the shut-off valve means. Stem 46 at its lower or inner end is provided with an outwardly directed end flange 48, seating against the bottom wall of the cup-shaped retainer 44. An externally threaded retaining sleeve 50 is engaged threadedly in the retainer 44, which has internal threads for this purpose. Sleeve 50 at its lower end overlies the outwardly directed flange 48, thus to hold the stem 46 assembled with the sleeve 50, retainer 44, and sealing element 36.

It will be observed that the sleeve 50, which may also appropriately be termed as a rigid, metallic, retaining collar, secures the lower portion of the manually operable shut-off stem 46 for free rotation in the above mentioned, rigidly constituted retainer 44. It is also to be noted that the threaded external surface of the collar, being sealingly threaded into the matching threads of the interior of the retainer 44, serves as part of a lubricant seal. The arrangement is one in which the manually operable shut-off stem is mounted in the casing for movement by a user in a direction to cause the diaphragm to lengthen or shorten, as the case may be.

Referring to FIGURE 5, the stem 46 has a circumferential recess intermediate its opposite ends, in which recess an annular, circumferential sealing element 51 is provided. This enables submersible chemical cleansing of the lubricated and tightly assembled stem, collar, and retainer prior to their being assembled in the valve. The components are so disposed as a safety factor to prevent even a slight smear of lubricant from getting onto a part of the valve that is exposed to the flow passage, during assembly. This is important, since the valve is intended for use with high pressure gases that are violently, chemically opposed to lubricants.

It will be noted that the stem seal holds no pressure, as the diaphragm prevents pressure from reaching these parts in the assembled valve. Its only purpose is to seal the lubricant from dilution or contamination as the valve or parts thereof are thoroughly, submersibly cleansed. The valve shut-off stem rotates within this seal.

The stem 46 projects exteriorly of the nut 34, and at its projecting, upper end, has a reduced, smooth-walled axial extension, on which is fitted a valve handle 52 formed in the present instance, but not necessarily, as a peripherally knurled hand wheel. In the illustrated example, a connecting pin 54 extends through a diametrically disposed passage of the stem 46. Pin 54 is formed as a reduced axial extension of a set screw 56 threadably engaged in a radial, threaded passage 57 formed in the boss of the handle 52.

Formed in the inner end of the stem 46 is an axial recess 58, adapted to receive an axial projection 60 formed interiorly of the retainer 44 upon the bottom of the retainer.

*Volume Control*

The projection 60 has an axial, downwardly opening, threaded recess adapted to receive the threaded stud 62 of an accessory pin 63, having a circumferential collar 64 embedded in the bottom wall of the resilient sealing element 36. Integral with the stud and collar is the elongated, small diameter pin member 66 of said pin, which pin member extends downwardly a substantial distance through the passage 20, into a hollow housing 67. The pin thus comprises stud 62, collar 64, and pin member 66.

It is to be noted that the accessory pin has its collar 64 so formed that the collar is of rigid, concavo-convex form and is located intermediate the threaded stud 62 and the reduced, lower end of the pin. The periphery of said collar is tapered, so as to be smaller at its lower edge, with its greatest diameter being very slightly less than the inside diameter of the flow passage over which it is located. The concave side of the collar is tightly, sealingly compressed against the convex bottom of the diaphragm, and cooperates with the undercut recess on the external surface of the bottom of the retainer, said recess being designated 67' in FIGURE 5, to effectively enforce compression rather than allow displacement of the bottom or shut-off sealing portion of the diaphragm whenever the shut-off means is tightly closed.

It is believed worthy of note, at this point, with respect to the operation of the shut-off means, that the wall of the chamber 18 in the casing freely clears the exterior surface of the diaphragm and cooperates with the rigid, cup-like retainer inside the diaphragm to prevent the diaphragm from being bent by the mechanical action of the shut-off means, as said means is opened to a flow-permitting position.

In the arrangement which we have devised, the generally cylindrical lower portion of the diaphragm chamber narrows abruptly, forming a smooth, ribless, shut-off valve seat. Said seat is somewhat concave but may be more accurately described by stating that as the chamber wall curves in abruptly toward the flow passage seat, an annulus is formed having a curved or concaved surface. This concavely shaped annulus immediately surrounds a second, somewhat cone-shaped annulus tapering in such a manner as to be lower at its smallest dimension, which would be the flow passage opening. The second annulus has a straight surface slanted toward the center, forming the slanted, annular, shut-off valve seat, so formed that any sediment will have the benefit of gravitational fall to free itself from said seat.

The arrangement is such that the convex curve of the diaphragm bottom will first contact that central portion of the annulus of the seat midway between its inner and outer peripheries, thereby causing the greatest point of compression to the diaphragm bottom to be along an annular line, directly below the annular flange of the shut-off stem. This feature lends itself considerably to the life of the diaphragm when it is subjected to the intended, unusually high pressures, not heretofore commonly associated with a valve of the diaphragm type.

Member 66 extends into an axial bore formed in a headed volume control valve element 68. The reduced diameter portion of the element 68 extends downwardly through an opening formed in a volume control valve element retainer 69.

The pin-receiving bore of the element 68 has a threaded counterbore, in which is engaged a retaining screw 70 axially bored to receive the member 66. Screw 70 bears against a replaceable, resilient washer 72 adapted to seat against an annular shoulder 73 defining a valve seat within the passage 20.

A contractile, coil spring 74 at one end is connected to the reduced portion of the element 68, and at its other end, is connected to an angular adjustment lever 76 fulcrumed intermediate its ends upon a pin 78. Lever 76 has a leg 80 extending approximately parallel to the length of the spring, and said leg is formed with a shallow recess 81, in which seats an axial projection 82 formed as an extension of an adjustment screw 84 that is engaged in a threaded bore 85 formed in the side wall of the housing 67. Bore 85 opens into a counterbore formed in an externally threaded boss 86, to which is applicable a threaded, cup-shaped cap 88.

A depending, externally threaded extension 90 is formed upon the housing 67, and has an axial bore 91 adapted to communicate with the interior of the container on which the valve is mounted. Mounted against the wall of the bore 91 is a tongue 92, having at its lower end a laterally outwardly projecting lip 93 apertured to receive a screw 94 threaded into the lower end surface of the extension 90.

At its upper end, tongue 92 is formed with a tooth 96 engaged in a small recess of the wall of the housing 67, thus to hold the tongue 92 firmly in place.

At its upper end, tongue 92 has a bifurcated ear 97, receiving the angular lever 76, the pin 78 being carried by said ear.

*Safety Relief Valve Means*

Figure 7:
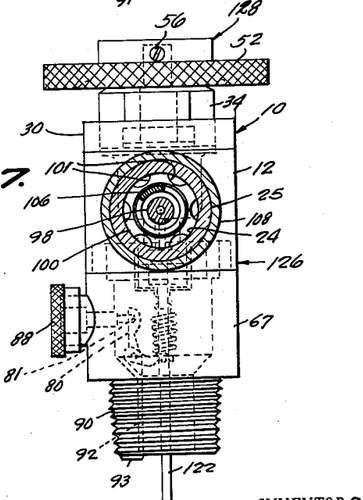
FIGURE 7 is a sectional view through the valve, substantially on line 7—7 of FIGURE 5, showing in transverse section the safety relief and bleeder means.
Figure 8:
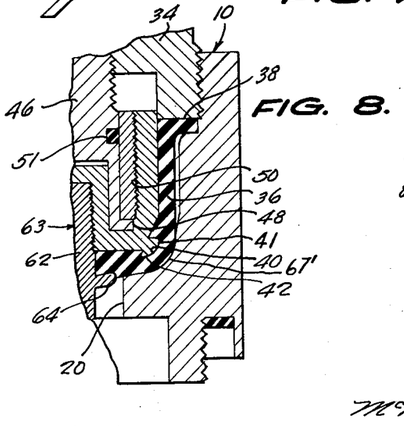
FIGURE 8 is an enlarged, fragmentary sectional view on the same cutting plane as FIGURE 5.

Referring to FIGURES 5 and 7, this includes an elongated relief valve stem 98 extending axially within counterbore 24 and terminating, adjacent its inner end, in a collar 100, having a forward face provided with an annular, undercut groove in which is engageable an annular, resiliently compressible, replaceable washer 102 adapted to bear against a rib or annular valve seat 104 surrounding passage 22.

The collar 100 is formed with a series of peripherally spaced notches 101 (see FIGURE 7) to provide ports through which escaping gases may pass whenever the relief valve goes into operation responsive to excess pressure within the container.

Figure 1:
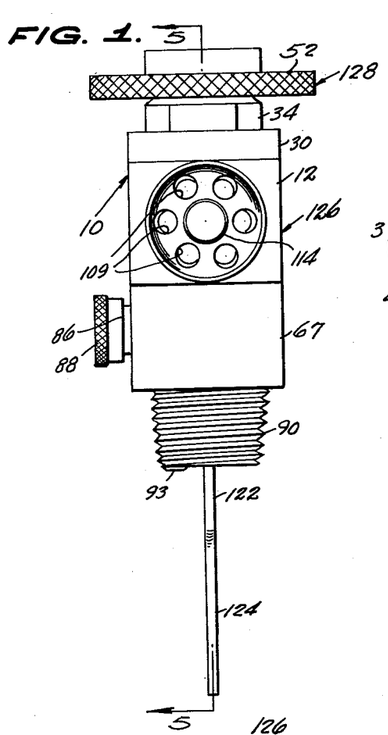
FIGURE 1 is an end elevational view of the valve comprising the present invention, as seen from the safety relief side thereof.
Figure 2:
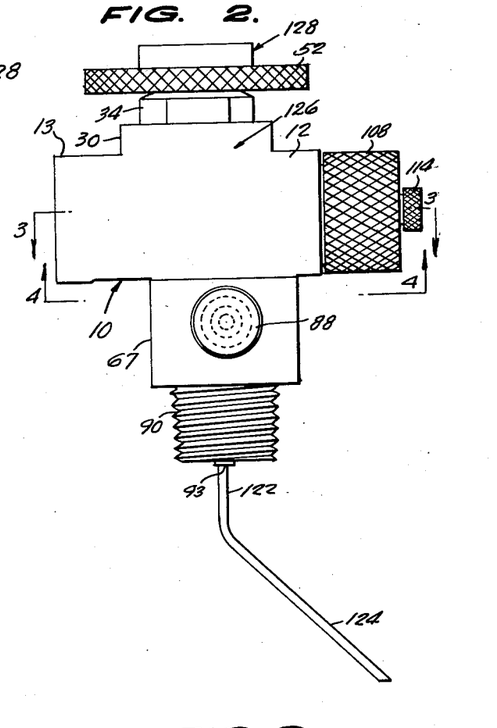
FIGURE 2 is a side elevational view of the valve as viewed from the left of FIGURE 1.
Figure 3:
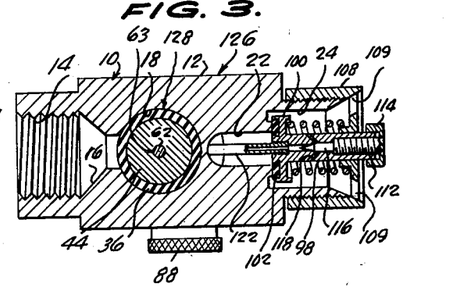
FIGURE 3 is a longitudinal sectional view substantially on line 3—3 of FIGURE 2.

A compression, coil spring 105 is circumposed about the stem 98, and at one end bears against the collar 100. At its other end, spring 106 bears against a cup-shaped retaining cap 108, having an annular series of relief ports or openings 109 (FIGURE 1).

A passage 110 is centrally formed in the cap 108, permitting free sliding movement of the stem 98 therein, said passage being formed in an internally projecting boss about which the spring is circumposed as clearly seen in FIGURE 5.

Referring now to the bleeder means, this includes a threaded shank 112, engaged in a correspondingly threaded bore 113 axially formed in the outer end portion of stem 98.

The shank 112 is integrally formed at its outer end with a head 114, provided with a peripheral skirt embracing the outer extremity of the stem 98. A suitable gasket means can be employed between the head and the outer end of the stem, to prevent leakage between the bleeder shank 112 and the wall of the recess 113.

Shank 112 at its inner end is integrally formed with a reduced, sharply pointed stem or plunger 116, and said plunger is adapted to close obliquely disposed passages 118 communicating between the axial bore of the stem 98 and the space surrounding said shank within the counterbore 24. The axial bore of the stem 98 has been designated at 120, and the pointed end of the plunger 116 closes said bore or passage 120 in normal use of the device as clearly seen in FIGURE 5.

Bore 120, at its inner end, has a threaded counterbore receiving the correspondingly threaded upper end of an elongated bleeder tube 122. This extends within passage 22, and is projected through the hollow interior of the housing 67, terminating well below the housing 67 in an angular extension 124 that extends into the interior of the associated container, not shown.

General Discussion

It is believed appropriate at this time to note that the combination valve comprising the present invention includes a plurality of main assemblies or components. Thus, all the stationary supporting portions of the device cooperate to define a casing. Said casing has been generally designated at 126, and can appropriately be considered as comprising the body 12, the housing 67, the nut 34, and the retaining cap 108. Mounted in said casing, in a generally vertical, upwardly projecting position is the manually operable shut-off valve means, which has been generally designated 128 and which of course includes the stem 46, handle 52, sealing element 36, sleeve 50, retainer 44, and the pin 63 comprised of stud 62, collar 64, and depending pin member 66.

At the end of the casing 126 remote from the safety relief and bleeder valve means, there is provided means, which in the present instance is in the form of the threaded bore 14, for connecting an outlet line to the device. In this connection, the safety relief and bleeder means has been generally designated 130. It comprises, of course, stem 98, shank 112, spring 106, and all components formed integrally with or otherwise carried by these main portions of the safety relief and bleeder valve means. Further, it can be considered that the means 130 includes the bleeder tube 122.

In addition, the valve includes a volume control means generally designated 132. This comprises tongue 92 with associated connecting means, lever 76, adjusting screw 84, spring 74, valve element 68, and washer or sealing element 72. This means further includes the retainer 69.

Operation.—Flow Passage Shut-Off Portion

Considering the use of the device, as previously indicated herein the device would be mounted upon the outlet of a container in which gases may be retained under pressure. Of course, any flow whatever from said container to the outlet line, is capable of being completely prevented by manual operation of the shut-off valve means 128. Said means, it may be noted from FIGURE 5, is shown in its closed position. By rotating the handle 52, the stem 46 is elevated, thereby elevating the lower end of the sealing element or diaphragm 36. In this connection, when the shut-off valve means is in closed position, the diaphragm would be resiliently distended, in a direction axially of the stem 46. On moving the shut-off valve means to a flow-permitting or open position, the diaphragm is permitted to contract somewhat.

It is an important feature of the diaphragm, in this connection, that at all times, its entire surface, on the side thereof opposite that against which the gas pressure is exerted, is backed by solid metal material. In other words, the retainer 44 is in full contact with the interior surface of the cup-like sealing element 36, and as a result, said sealing element is not subject to the pressure fatigue that is normally encountered over a period of time when a conventional diaphragm is used. Conventional diaphrams are also required to be almost continuously bent, during their normal operation, and this repeated or substantially continuous bending reduces the strength of the diaphragm over a period of time, so that eventually fatigue from said bending sets in, causing a sudden rupturing of the same, sometimes with exceedingly disastrous results.

By reason of the illustrated arrangement, this does not occur, since one side of the diaphragm is strongly backed by a solid metallic surface defined by the retainer 44, and the other side is enclosed in the diaphragm chamber. This effectively prevents bending under high pressures or mechanical action.

When the shut-off valve means is in open position, the flow of the gas would be upwardly through the housing 67, passage 20, and the bore 14 into the outlet line.

Operation.—Volume Control

Figure 4:
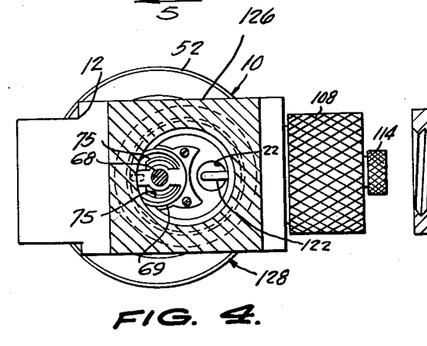
FIGURE 4 is a sectional view through the valve taken substantially on line 4—4 of FIGURE 2, showing the surge control or excess flow portion.
Figure 6:
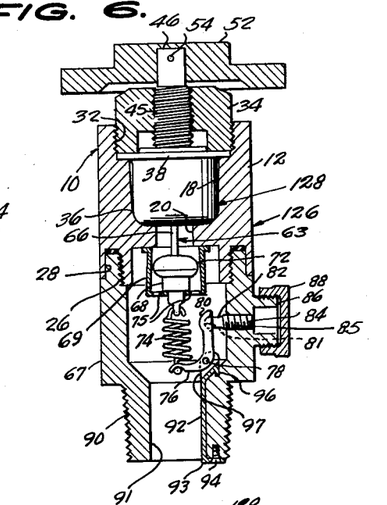
FIGURE 6 is a section through the valve substantially on line 6—6 of FIGURE 5, showing the manually operable shut-off means and the surge control means.

Referring now to the volume control means, when the device is in normal operation, the valve element 68 would not be engaged against the seat 73. It will be observed, however, that free flow of gases past the unseated valve element is permitted by reason of the fact that there are apertures 75 (see FIGURES 4 and 6) in the bottom wall of the retainer 69. Further, the periphery of the valve element 68 and washer 72 is spaced inwardly a short distance from the wall of the retainer 69, to permit the free flow of gases past the washer into the passage 20.

Spring 74, of course, holds the valve element 68 unseated. In this connection, if there were a sudden accidental rupturing of the discharge line connected to the valve body, that is, if there were a breakage of the flow line downstream from the valve, pressure on the downstream side of the valve element 68 would be suddenly reduced in respect to pressure at the upstream side thereof. This sudden imbalance of pressure at the upstream and downstream sides of the valve element causes a sudden attempted volume increase, sufficient to cause the valve element to be instantaneously moved to a seated position against the seat 73 against the restraint of the spring. The moment the element seats, of course, all leakage of gas is halted, and now there is sufficient pressure to insure that the valve element will be firmly held against its seat 73 until such time as repairs can be effected and the device placed, once again, in normal operation.

The arrangement of the volume control valve element, in other words, is such that as long as the volume of gas is not excessive, the spring 74 will bias the same to an unseated position. When, however, pressure on the upstream side exceeds that on the downstream side, as for example when there is a rupture of the outlet line, the sudden increase of volume of gases attempting to pass element 68 will overcome the force of the spring and will cause the element 68 to seat. A safety shut-off means is thus provided.

The pressure of the spring 74 can be adjusted as desired, by means of the lever and of the screw 84. In this connection, normally there is a complete seal about the screw due to the provision of the cap 88 which of course could be provided with a sealing gasket bearing against the boss 86. The cap is readily removed, even during normal operation of the device, and the screw 84 can be rotated as necessary to cause the position of the lever 76 to be changed. This either increases or decreases the tension of the spring 74, whichever is desired. All this is achieved without leakage of gases, and the adjustment can be made during regular operation of the valve.

The construction illustrated and described is one in which a volume control means consists of the spring 74, yieldably suspended from a slug (the element 68) that is guided centrally within a somewhat tubular, slightly cone-shaped holder or retainer 69. Retainer 69 forms, as will be noted, a slightly enlarged extension to, and somewhat outwardly tapered continuation of, the flow passage 20. The internal diameter of the generally semi-circular, somewhat tubular retainer 69 is slightly greater at the lower or inlet end thereof, than at the upper end of the retainer, which attaches to and immediately surrounds the lower seating shoulder 73 of the flow passage in the shut-off valve casing. When the slug is positioned by the spring down against the holder at the maximum open position of the slug, the encircling area between the perimeter of the slug and the immediately adjacent internal diameter of the retainer is slightly less than the area of the flow passage in the casing when the accessory pin is extended through said passage. As the slug is moved toward its seat by an attempted increase of volume due to a sufficent increase of pressure within the container, or by a decrease of pressure at the outlet line, said encircling flow pasage area immediately surrounding the perimeter of the slug is immediately reduced.

As gas, contained at a generally normal pressure, is flowing through the passage to an intended source, the preferred tension of the spring is such that the desired amount of volume would keep the slug suspended generally midway between its open and closed positions. Should the pressure in the container gradually increase or decrease, the correspondingly attempted increase or decrease of volume through the area surrounding the slug at its generally midway position would cause the yieldable spring to which the slug is attached to extend or contract as said volume passing the slug so exerts its effect upon the slug.

Said attempted increase or decrease of volume, therefore, causes an instantaneous repositioning of the slug to a point, either deeper within or less deep within, the tapered retainer 69 that defines a part of the flow passage. This would correspondingly decrease or increase the flow passage area encircling the slug, which in turn causes the volume to remain at a fixed value, even though the pressure has varied.

It will thus be clearly seen that automatic volume control is accomplished. It may be seen with equal clarity that complete effectiveness of the volume control would be limited by tension of the spring to a given range of pressures, and even then to only one fixed volume value. However, this limitation is removed without changing the spring for another of a different tension, by reason of the adjusting means.

With reference to the adjusting means, it is to be noted that the volume control means (see FIGURE 6) is so designed that the contractile coil spring is attached at one end to the reduced portion of the slug and at its other end is connected to the angular adjustment lever, which is fulcrumed intermediate its ends upon the pin 78, carried by the bifurcated ear 97 formed upon the top end of tongue 92 attached to the casing. It is further believed worthy of emphasis that the upwardly extending portion of the lever is contacted by the adjusting screw, that extends through the wall of the valve casing in an arrangement by which the tension of the contractile spring can be readily adjusted through the medium of the lever and screw. The parts are so disposed that the volume control adjusting means is readily accessible exteriorly of the valve housing, enabling the user, even while the valve is in operation with gas flowing therethrough, to regulate or adjust the automatic volume control. The adjustment is so designed, further, as to release a fixed volume of a greater or lesser value as desired for a particular application, and said adjusting means is equally as effective to compensate for a variety of different pressure ranges that are encountered in various kinds of gases.

With still further reference to the operation and advantages of the volume control means, it is to be observed that said means differs from volume controls of the prior art in that the slug is faced with the replaceable, resilient washer 72, so aligned with the machined seat 73 in the flow passage, that should there be a sudden rupture or breakage of the gas line at the outlet of the shut-off valve, the sudden increase of volume would cause the slug to overcome the tension of the contractile spring, as a result of which the slug will sealingly seat upon shoulder 73 within the flow passage. This instantly seals off completely the flow of gas even though the shut-off valve means is completely open. Because pressure within the container was sufficient to cause the slug to seat, it is more than sufficient to hold the slug seated. Thus, a safety shut-off means is provided, as a feature of the volume control means, and in its sealingly seated position the perimeter of the slug is still a very short distance away from the tapered wall of its encasing retainer. This leaves a very small encircling area around the perimeter of the slug, and it is therefore understood that only a sudden increase of volume, or an instantaneous pressure surge, can cause the slug to seat.

A gradual increase of pressure within the container will activate the volume control means, but even though said pressure increase should become considerably abnormal, it will not seat the safety shut-off means so long as the increase in gradual. This is because said abnormal, gradual increase of pressure would cause the volume of gas passing the slug to pull the slug down toward its seat, to a point within its encircling, tapered retainer to where the flow passage area surrounding the immediate perimeter of the slug is equalized by a like area between the face of the slug and the safety shut-off seat opening. Only a sudden surge of gas will overcome this equalization.

The part that the accessory pin plays in the volume control means is also considered to be of particular importance. The pin extends downwardly from the center of the shut-off valve means, to act as a centering guide for the slug 68, to so align the same with its safety shut-off seat that a perfect seal is obtained, allowing no chance of malfunctioning.

*Operation.—Safety Relief Valve Means*

Referring now to the safety relief means, normally, the safety relief valve is seated as in FIGURE 5. However, if pressure within the container should exceed a predetermined, safe value, said pressure will of course unseat the safety relief means against the restraint of the spring 106. The gases so released will now flow through the peripheral series of notches or recesses 101, and will pass out through the outwardly slanted ports or openings 109. As soon as the pressure is decreased in value, the spring 106 will expand and will once again seat the valve.

It is another feature of the invention that combined with the safety relief valve is a bleeder valve means. As will be noted, if desired, the bleeder valve can be moved outwardly, to expose passages 118 so that excess gases can be removed through tube 124 and passages 118, passing out through the openings 109.

A desirable feature of the bleeder valve passages 118 is found in the fact that they are angled toward the periphery of the collar 100. Therefore, whenever desired, one can clear foreign material from the recesses 101, merely by unscrewing the bleeder valve plunger sufficiently to expose passages 118. As small amount of gas is caused to be forced under high pressure through the passages 118, directly against the notched periphery of the collar 100, so as to clear the relief valve of any obstructions.

With further reference to the safety relief valve means, we have designed the same to operate accurately, efficiently, and immediately whenever the pressure within the container exceeds a predetermined value. The construction illustrated and described is further so designed that after each activation by excess pressure, the safety relief valve will close accurately and will each time retain the same pressure value. This eliminates a common deficiency found in the relief valves in general use at the present time.

In hot climates, temperatures cause gas expansion in exposed small containers wherein the pressure often causes repeated activation of the safety relief valve means. While some relief valves operate with reasonable accuracy, millions of pounds of the consumer's gas are wasted each year because the safety relief valves do not close properly. The cause of this inaccuracy is that the compression spring generally provided to hold the seating collar or piston of the valve upon the annular rib seat seldom exerts pressure evenly around the circumference of the collar. This causes the collar to tip slightly and seat unevenly. As a result, the sealing washer between the collar and rib is compressed tightly at one point on the circumference of the annular rib, while at a point across the rib's diameter from the first mentioned point there is only a very slight seating pressure. It is impossible to adjust such a safety relief valve to open or close with any degree of accuracy. This condition is not at all uncommon in thousands of valves in use today and especially in those valves that have no guide means for their collars to hold the collar parallel with the seating surface of the annular rib. Those safety relief valves of the prior art that have collars with a guide surface at their perimeters, it may be noted, have a strong tendency to bind within their bores, since the length of the guide means is too short as compared to the bore diameter.

This type of valve is in general use, and in fact both of the valves mentioned above are characterized in that binding results in their normal operation, said binding being the result of uneven spring tension. When such a relief means has been activated, the tipping action of the uneven spring tension cooperates with escaping gas pressures to cause a binding of the short collar guide in its encircling bore sufficient to hold the valve open long after the intended necessary reduction of gas pressure.

These deficiencies have been successfully combated or overcome, by means of using a collar having a long guide stem, with the end of said guide stem remote from the collar protruding outwardly through the center opening of the tension-adjusting relief valve cap 108. While the surfaces of the perimeter of the collar 100 between the escape ports 101 glide freely within the relief bore 24, the opposite end of the stem 98 glides freely within the central bearing of the relief valve cap 108, forcing a perfect seating alignment regardless of the variation of application of spring tension. The points of guiding action being spaced at a comparatively greater distance apart longitudinally of the relief valve, the above mentioned binding is eliminated.

With further reference to particular advantages derived from our construction, it is to be noted that the safety relief valve means has a collar 100 formed with an inwardly extending, annular, undercut recess that firmly holds the somewhat resilient seal 102. Said seal abuts a flat, annular surface of a rib-type safety relief valve seat 104. The undercut recess prevents removal of said seal by possible adhesion to the rib annulus due to prolonged seating under pressure. Further, the width of the rib annulus being in close tolerance to the recess opening cooperates to enforce compression rather than displacement of said somewhat resilient seal 102, thereby retaining the original adjustment of the spring tension.

These features lend considerably to a safety relief valve means that will open and close with a desired accuracy, thereby eliminating an unnecessary loss of gas and particularly enabling a tight adjustment of said safety relief means for unusually high "pop-off" pressures without damage to the sealing washer.

The particular construction of the safety relief valve cap 108 is also of importance. This cap is threaded upon the valve casing, as previously noted, to adjust the tension of the safety relief compression spring, and the cap has the annular series of outwardly slanted gas relief apertures 109 near the circular edge of its partially closed-in end.

Said end of the cap has a central aperture or passage 110, with an interiorly extending, annular lip 111 around which one end of the compression spring 106 seats, said aperture serving as a glide bearing for the guide stem of the safety relief valve means.

Referring now to the bleeder valve assembly, the construction is such that a convenient bleeding action through the safety relief valve is obtained without detaching the filling medium from the flow passage outlet as the container is being filled.

In this connection, it is appropriate to note the construction of the bleeding tube 122, considered more particularly. The angular tube 122 threadedly, sealingly engages in a correspondingly threaded inner end of the guide stem 98, and extends angularly down the relief passage and down to and outwardly through the flow passage inlet of the multi-purpose valve, communicating with the container interior. It is so disposed as to provide a more convenient bleeding action, where installation will permit, that enables bleeding simultaneously with filling of the container.

Operation.—In General

It is to be further noted that there is a particular coactive relationship between the shut-off valve means and the volume control means 128, 132, respectively. When the shut-off valve is completely closed as in FIGURE 5, the lower end of the pin member 66 is almost at the inner end of the axial bore of the valve element 68. Therefore, the volume control valve element 68 in these circumstances could not close, and in fact, there would be no purpose in its moving to a closed position at this time.

If the shut-off valve 128 is in its completely open position, the member 66 moves upwardly a distance such as to permit the valve element 68 to move fully to and in sealing engagement with the seat 73, should the occasion arise when the valve element 68 is to go into operation responsive to a sudden surge of gas at the upstream side thereof resulting from rupturing of the line downstream from the valve.

If desired, the volume control means can be intentionally de-activated, even with the shut-off valve in open position. This is effected by moving the valve 128 to a partially open position. In these circumstances, member 66 moves upwardly, but does not move upwardly a distance sufficient to permit free movement of the valve element 68 fully to a seated position. Instead, when the element 68 attempts to move to a seated position it abuts the lower end of the member 66 before it moves against the seat 73. This is desirable in some instances, when it is proposed to empty a container into free space or atmosphere.

In another manner of use, the shut-off valve means might be in its full open position, with the outlet line connected to an intended source to which the gas is to be supplied. In these circumstances, the valve element would be in a de-activated position as in FIGURE 6, and by selective adjustment of the tension of the spring 74, can be used to operate as an excess flow valve, keeping the amount of volume that would be allowed to escape through the valve at an even flow or value. The amount of said even flow can be regulated to be either of a higher or lower value, by selective positioning of the lever. These adjustments can be made during normal operation of the valve, since there is no leakage about the screw 84. This feature permits the adjustments to be made accurately, by reason of the fact that the user can observe the volume of flow past the element 68.

It is thus seen that the adjustable feature of the volume control means is so designed as to afford automatic volume regulation, with the volume being easily selected and regulable from the exterior of the valve.

Considering further the relationship between the safety shut-off means and the volume control, it is to be noted that the accessory pin 63 is disposed, in addition to its other functions, as a medium to render the safety shut-off means operational whenever desired, while allowing the volume control means free to function properly. The accessory pin is so attached to the shut-off means that by adjusting the manually operable shut-off means approximately one-fourth closed from a completely open position, the lower end of the accessory pin will then be in a position to allow complete freedom of the volume control means, but will allow the slug to close only to the point of equalization as previously described herein.

At this point of equalization, the bottom of the guide bore in the slug abuts the bottom of the accessory pin and the safety shut-off means is prevented from contacting its seat regardless of the instantaneous volume of pressure surge. It is to be noted, in this regard, that the shut-off valve must be at its maximum open position to allow the safety shut-off means to sealingly close.

The accessory pin is further disposed as a medium to simultaneously render the safety shut-off means, and the volume control means, non-operational when so desired by the user. By closing the manually operable shut-off means approximately one-half way between its opposite extreme positions, the bottom end of the accessory pin interferes with the normal movement of the volume control slug and prevents said slug from completing said control. This is a desirable feature, for instance, should a user desire to empty a container into free space or atmosphere.

It may be noted that the areas of the flow passage openings are so designed that when the shut-off valve is half-way opened, the shut-off means does not interfere with the flow passage area. The mechanical motion of the shut-off means between half-way open and completely open is only to facilitate exterior manual control of the safety shut-off and volume control means. Opening of the shut-off means from half-way open to completely open does not increase the flow passage area.

Still further, the accessory pin is also the medium that unseats the safety shut-off valve defined by the slug 68 when resumption of flow is desired after the safety shut-off means has been activated. This is accomplished by manually closing the main shut-off valve partially. The lower end of the accessory pin strikes the bottom of the guide bore provided therefor in the slug and pushes the slug downwardly off its seat 73. As the seal is opened, the spring 74 takes over and normal flow of gas is resumed.

In a preferred embodiment, the diaphragm or sealing element 36 would have a plurality of different resiliencies, at different locations along the length thereof. Preferably, from a location just above the annular internal locking groove 40 the diaphragm is of a considerably higher resiliency than it is below said location.

Another characteristic of the invention is also believed worthy of note. Apart from the function of the pin member 66 in serving as an abutment, in certain positions of the shut-off valve, which abutment limits the movement of the element 68 toward its seated position, said member 66 will serve as a guide, along which the element slides during the movement of said element to and from its seated position. The element is thus positively imparted a straight line, axial motion, designed to prevent malfunctioning or improper seating thereof, with the final result that a perfect sealing action is achieved by the element 68 at all times.

With further general reference to the valve construction, it is to be noted that said valve construction is of a combination type which will not only have all the various desirable characteristics hereinbefore noted, but in addition will have the characteristic wherein it has a casing designed to be readily, threadedly separable.

The arrangement is one in which the entire lower half of the valve can be removed, so as to eliminate the safety shut-off and volume control features, the construction being further designed to permit the bleeder tube to be removed, if desired, while leaving an efficient bleeder means still intact. All this is achieved in an arrangement such that there will still remain a compact shut-off, bleeder, and safety relief combination valve.

It will be noted that while the safety shut-off and volume control means are detachable as above described, the accessory pin on the bottom of the shut-off means is left permanently attached to said shut-off means 128. This division or separability of the combination valve as above described is proposed to permit the cost of manufacture to be reduced, in that the manufacturer can assemble only as many components as is desired in producing a particular type of valve, with all the components being interchangeable in valves of different types sold by the same manufacturer.

It is also to be noted that the valve of the combination type is so separable as to leave a compact shut-off, bleeder, and safety relief combination valve, adaptable particularly to thread onto an improved liquid level gauge such as shown in the companion applications hereinbefore referred to. There is thereby formed a combination valve and liquid level gauge for mounting upon a container adapted to hold a quantity of liquid, whereby an indicator may provide a reading, on a calibrated dial, of the liquid level within the container.

As will be apparent from the companion application drawn to a "Combination Valve and Liquid Level Gauge" filed concurrently herewith, the multi-purpose valve hereinbefore described is closely related to the structure shown in said companion application, in that the shut-off means 128 of the valve, through the medium of an accessory pin, unlocks the automatic locking mechanism of said gauge.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any change in construction that may be permitted within the scope of the appended claims.

What is claimed is:

1. A valve comprising a hollow casing having a flow passage, shut-off valve means mounted in said casing to control flow through the passage, said means including a resiliently elongatable diaphragm affixed at one end to the casing, the other end of the diaphragm being disposed to prevent flow through the passage responsive to a predetermined resilient elongation of the diaphragm, a rigid retainer conformably shaped to fit within said diaphragm disposed within said diaphragm, a shut-off stem mounted for movement in a direction axially of the diaphragm and carrying said retainer, and a rigid retaining collar connecting said retainer to said stem, volume-control means mounted in said passage for movement between a normal flow-permitting position and a flow-preventing position, means on said shut-off valve means on which said volume-control means slides during its movements between said positions thereof, and hand-actuable means operatively connected to said stem for effective movement of said diaphragm in a direction to elongate the latter.

2. The valve according to claim 1, wherein the means on the shut-off valve means on which said volume-control means slides embodies an accessory pin.

3. The valve according to claim 1, wherein the connection of said collar to the retainer and the stem embodies exterior threading on the exterior of said collar interengaging matching threads formed on the interior of said retainer.

4. A valve having a hollow casing having a flow passage, shut-off valve means mounted in said casing to control flow through the passage, said means including a cup-shaped diaphragm of molded formation having a plurality of different resiliencies, said diaphragm having an end wall and having a generally cylindrical side wall, said end wall being substantially thicker and of substantially lower resiliency than said side wall so as to effect a balance between and minimize mechanical and pressure fatigue in said diaphragm, said casing having a chamber the wall of which freely cradles the exterior wall of the diaphragm, said shut-off means including a rigid cup-like retainer disposed within the diaphragm, said wall of the chamber cooperating with said retainer to prevent distortion of the diaphragm by the mechanical action of the shut-off means by operation of said shut-off means to a flow-permitting position, said diaphragm chamber having a generally cylindrical lower portion abruptly narrowed to form a smooth ribless shut-off valve seat, the abrupt narrowing of the chamber wall defining an annulus having a concave surface, said casing having a second substantially conical annulus tapering in a downward direction to form an opening communicating between the flow passage in said chamber, said second annulus having a surface slanted toward the center thereof to form a slanted annular shut-off valve seat whereby to permit sediment to have gravitational fall to free itself from said seat, the end wall of the diaphragm having a convex surface so disposed as to first contact the central portion of the first-named annulus intermediate the inner and outer diameters of said first-named annulus thus to locate the greatest point of compression of the end wall of the diaphragm at a circular line, the shut-off means including a stem carrying said retainer and formed with an annular flange, said stem being disposed directly below said annular flange, said shut-off means further including a relatively large retaining nut, said stem being manually-operable and being axially threaded in the nut, the nut being formed with an inwardly-extending smooth wall cylindrical recess, said retainer having an upper portion formed with an external surface slidably engaged in the nut recess with a close tolerance, the cylindrical recess of the nut having an edge extending about the stem-receiving opening thereof, the area between said edge and the outer periphery of the nut being of flat formation defining a flat annulus on the face of the retaining nut periphery, the diaphragm being formed with a lip engaged by said annulus, the diaphragm chamber having a wall formed with an annular chamber, said annular shoulder extending outwardly of the chamber and the annulus of the nut having an outer portion holding the lip of the diaphragm upon said shoulder, said annulus of the nut having an inner portion extending inwardly over the diaphragm chamber as an encircling abutment across the thickness of the periphery of the cylindrical diaphragm wall, said abutment being disposed to serve as an abutment against which the cylindrical diaphragm wall may be longitudinally compressed on operation of the shut-off means to flow-permitting position and a rigid, metallic, retaining collar connecting the lower portion of the manually operable shut-off stem to the retainer for rotation relative to the retainer, said retaining collar having an exterior sealingly threaded into matching threads formed upon the interior of said retainer.

5. A valve as in claim 4, wherein said stem is mounted in the casing for movement by a user in a direction axially of the diaphragm, whereby to extend the diaphragm responsive to axial shifting of the stem in one direction with the diaphragm anchored at one end to the housing against movement longitudinally of the stem.

6. A valve as in claim 5 wherein said stem is formed with a circumferential recess intermediate its opposite ends, the shut-off means including a circumferential seal engaged in the recess of the stem, said recess and the seal engaged therein being disposed as safety means preventing the passage of lubricant to valve components exposed to the passage of gases flowing through the valve, said stem being rotatable within the seal engaged in the recess thereof.

7. A valve comprising: a hollow casing having a flow passage; shut-off valve means mounted in and controlling flow through said passage, said means including an accessory pin extending within the passage; and volume control means including a tubular, slightly cone-shaped retainer forming a slightly enlarged extension to and generally outwardly tapered continuation of the flow passage, said retainer having an upper end secured to the casing, the flow passage having a seating shoulder surrounded by said upper end of the retainer, said retainer having a lower, opening end, the retainer being slightly greater in internal diameter at said lower end than at the upper end thereof, a slug guided centrally within said retainer, a spring engaged with said slug and tensioned to normally bias the slug against the retainer at a maximum open position of the slug, the encircling area between the slug perimeter and the adjacent internal diameter of the retainer being slightly less than the area of the flow passage in the casing when the accessory pin is extended through said passage, said slug being movable toward said shoulder responsive to an attempted increase of volume due to higher pressure upstream from the slug than downstream therefrom, whereby to reduce said encircling flow passage area immediately surrounding the perimeter of the slug, against the tension of the spring, said spring tension being arranged so as to dispose the slug substantially midway between its full open and its full closed positions under conditions in which there is a desired amount of volume, said retainer, slug, and spring being relatively formed and arranged in such manner that should the pressure in a container associated with said valve gradually increase or decrease, a correspondingly attempted increase or decrease of volume through the area surrounding the slug at said generally midway position of the slug will cause the spring to extend or contract as said volume passing the slug so exerts its effect on the slug, whereby said attempted increase or decrease of volume will cause an instantaneous repositioning of said slug to a point either deeper within or less deep within the tapered retainer to produce a correspondingly decrease or increase of the flow passage area encircling the slug, thus to cause the volume to remain at a fixed value without regard to variations in pressure.

8. A valve as in claim 7 wherein said volume control means further includes means for adjusting the tension of said spring, said spring being of the contractile coil type, the slug having a reduced portion to which one end of the spring is attached, said spring tension adjusting means including an angular adjustment lever fulcrumed intermediate its ends within the casing, said spring being connected at its other end to said lever, said spring tension adjusting means including a tongue secured to the casing and having a top end formed with a bifurcated ear between which the intermediate portion of said lever is received, a pin carried by said ear and passing through the lever to provide the fulcrum of the lever, an adjusting screw threadedly engaged in the valve casing, the lever having an upwardly extending portion contacted by said screw whereby on selected positioning of the screw, the lever will be adjustably, correspondingly positioned for adjusting the tension of the spring, said screw being so disposed as to permit ready accessibility of the spring tension adjusting means from a location exteriorly of the valve housing, thus to enable a user, during the operating condition of the valve with gas flowing therethrough, to regulate the tension of the spring so as to adjust the volume control means in a manner to release a fixed volume of a selected value, said screw and lever being adjustable through a range of positions such as to compensate for a variety of different pressure ranges encountered in a variety of gases the flow of which is controllable by operation of the valve.

9. A valve as in claim 8 wherein said slug includes a replaceable, resilient washer providing a facing on the slug, the shoulder surrounded by the slug retainer defining a machined seat against which the slug engages in the full closed position of the slug, said washer being so aligned with said seat that on sudden rupturing of a gas line extending from the outlet of the valve, the resultant, sudden increase of volume will cause the slug to overcome the tension of the contractile spring to sealingly seat the slug upon said shoulder within the flow passage to instantaneously seal off completely the flow of gas in conditions in which said shut-off valve means may be in completely open position, the periphery of the slug, in the fully closed position of the slug, being disposed at a very short distance from the wall of the associated slug retainer to leave a correspondingly very small encircling area about the slug periphery.

10. A valve as in claim 7 wherein said accessory pin extends downwardly from the center of the shut-off valve means, in position constituting the same as a centering guide for the slug, whereby to align the slug with the seating shoulder about which the slug retainer is disposed and thus effect a full sealing action through the full circumference of said shoulder on engagement of the slug thereagainst.

11. A valve as in claim 7 wherein said accessory pin is disposed to constitute means for rendering the safety shut-off constituted by the slug non-operational at the option of the user while yet permitting free functioning of the slug as a volume control means, said pin being attached to the shut-off means in such manner that by adjustment of the shut-off means toward its closed position from a fully open position, the accessory pin will be disposed in position to permit complete freedom of movement of the volume control means while being yet disposed as an abutment preventing movement of the slug fully into engagement with the seating shoulder.

12. A valve as in claim 7 wherein, responsive to movement of the shut-off means from a full open position thereof to a predetermined position short of its fully closed position, said accessory pin is positioned as an abutment that prevents the slug both from engaging the seating shoulder and from discharging its volume control functions.

13. A valve as in claim 7 wherein, responsive to movement of the shut-off means through a predetermined distance from its full open position to a location short of its closed position with the slug seated on the shoulder in a flow-preventing position, said accessory pin is moved to a position unseating the slug to permit flow through the valve.

References Cited in the file of this patent
UNITED STATES PATENTS

| | | |
|---|---|---|
| 1,493,149 | Crandall | May 6, 1924 |
| 1,970,744 | Goss | Aug. 21, 1934 |
| 2,527,381 | St. Clair | Oct. 24, 1950 |
| 2,632,462 | Selwyn | Mar. 24, 1953 |
| 2,659,565 | Johnson et al. | Nov. 17, 1953 |
| 2,666,448 | Garretson et al. | Jan. 19, 1954 |
| 2,987,309 | Biggle | June 6, 1961 |

FOREIGN PATENTS

| | | |
|---|---|---|
| 811,527 | Germany | Aug. 20, 1951 |
| 826,226 | Germany | Dec. 27, 1951 |
| 435,929 | France | Mar. 13, 1912 |
| 550,424 | Italy | Oct. 31, 1956 |